United States Patent
Wareus et al.

(10) Patent No.: US 12,314,403 B2
(45) Date of Patent: May 27, 2025

(54) SOFTWARE VULNERABILITY REMEDIATION

(71) Applicant: MICRO FOCUS LLC, Santa Clara, CA (US)

(72) Inventors: Emil Wareus, Stockholm (SE); Viktor Pettersson, Stockholm (SE); Carl Ternby, Stockholm (SE)

(73) Assignee: Micro Focus LLC, Santa Clara, CA (US)

( * ) Notice: Subject to any disclaimer, the term of this patent is extended or adjusted under 35 U.S.C. 154(b) by 203 days.

(21) Appl. No.: 17/895,902

(22) Filed: Aug. 25, 2022

(65) Prior Publication Data

US 2024/0070289 A1 Feb. 29, 2024

(51) Int. Cl.
*G06F 21/57* (2013.01)
*G06F 8/36* (2018.01)
*G06F 21/56* (2013.01)
*H04L 43/0817* (2022.01)
*H04W 4/00* (2018.01)

(52) U.S. Cl.
CPC .............. *G06F 21/577* (2013.01); *G06F 8/36* (2013.01); *G06F 21/568* (2013.01); *H04L 43/0817* (2013.01); *H04W 4/00* (2013.01)

(58) Field of Classification Search
CPC ..... G06F 8/65; G06F 8/70; G06F 8/30; G06F 8/71; G06F 21/564; G06F 8/36; G06F 8/44; G06F 21/577; H04L 43/0817; H04L 41/0869; H04L 63/1433; H04L 63/1416; H04W 4/00
See application file for complete search history.

(56) References Cited

U.S. PATENT DOCUMENTS

| | | | | |
|---|---|---|---|---|
| 9,235,704 | B2* | 1/2016 | Wootton | H04W 4/00 |
| 10,678,513 | B2 | 6/2020 | Kadam | |
| 2009/0055809 | A1* | 2/2009 | Campbell | G06F 8/36 |
| | | | | 717/140 |
| 2009/0300604 | A1* | 12/2009 | Barringer | G06F 11/3664 |
| | | | | 717/178 |
| 2017/0034023 | A1* | 2/2017 | Nickolov | H04L 43/0817 |
| 2020/0004528 | A1* | 1/2020 | Pape | G06F 8/65 |
| 2020/0042712 | A1 | 2/2020 | Foo | |

(Continued)

FOREIGN PATENT DOCUMENTS

CN 111783103 10/2020

*Primary Examiner* — Kyung H Shin
(74) *Attorney, Agent, or Firm* — Sheridan Ross P.C.

(57) ABSTRACT

Software is commonly built from a package of software packages, such as open-source packages. A package may require a number of interdependent packages, any one of which may have a security vulnerability. However, the dependencies between packages are often version specific and merely upgrading a package to the newest, or newest non-vulnerable, version may break a dependency and cause the software to be unbuildable (e.g., fail to compile or link) or, if built, faulty. By mapping dependencies to non-vulnerable versions a graphical representation may be built having one or more root-to-leaf paths identifying all the required packages by compatible version but exclude any vulnerable versions. The package may then be built to ensure the resulting software is both internally compatible between packages and absent known security vulnerabilities.

20 Claims, 7 Drawing Sheets

(56) References Cited

U.S. PATENT DOCUMENTS

2020/0202006 A1    6/2020  Shah
2021/0397426 A1  12/2021  Du
2022/0083667 A1    3/2022  Anwar
2023/0315860 A1* 10/2023  Yaron .................. G06F 21/577
                                                                726/25

\* cited by examiner

SOFTWARE VULNERABILITY REMEDIATION

FIELD OF THE DISCLOSURE

The invention relates generally to systems and methods for protecting software applications and particularly to determining a build list for building software that comprises required packages but omits versions of those packages having a fault, such as a security vulnerability.

BACKGROUND

The usage of open-source software is growing and with it, the number of vulnerabilities that attackers can utilize in order to perform malicious activities also grows. Open-source software is often selected to ease the burden of writing and maintaining software by incorporating open-source software to provide a previously developed solution to satisfy a need of an application or other portion of the software.

SUMMARY

Generally, and in one embodiment, two solutions are considered: a "brute force" solution and a graphical solution. The first solution gradually updates the affected versions of open-source software that a developer has directly imported in a project, until it finds an appropriate version. The second solution instead utilizes a graphical database solution to store graphical and/or other representations of all available versions of an open-source package and how it relates to other available open-source packages. The database can then be used to make secure versions directly query-able.

Simulations that were run in the project show that the graph database solution is far superior to the "brute-force" method when it comes to time efficiency and also that such a graph would be scalable for use even with very large data sets.

Graph databases are proven to be very effective in representing large and complex relations of data. Their power can be harnessed to allow a user to, with a click of a button, be able to fix all security vulnerabilities that their software contains.

When developing an application, time and cost are important factors to have in mind. It is commonplace to use previous innovations and technology to a great extent in order to minimize these factors, since reinventing the wheel often proves to be costly and ineffective. An auto manufacturer may, for example, want to out-source the production of door locks to another company that has more experience in the field, rather than attempting to create new ones from scratch.

An analogy can be drawn to software development, where it is popular to make use of open-source software when developing a product. Open-source refers to software which is publicly available to see, modify or optimize. It can also be allowed usage in commercial products and the code is then often uploaded as packages to a package registry, making it easy to use. This way developers can avoid having to recreate basic components from scratch, while also being able to contribute to their further development. Open-source packages can use code from other packages, making it a requirement to also include those in order for it to run properly. The needed package is usually referred to as a dependency of the package which requires it and it is possible for open-source packages to have large trees of dependencies needed for it to run.

Since open-source software is available for public scrutiny, it allows attackers to attempt to find weaknesses in the code which could be exploited. The strength in letting users modify the published code is that it allows bugs, such as security weaknesses, to quickly be fixed by releasing new versions of a package. This makes it important for developers to keep the open-source packages they use up to date. Security weaknesses that can be exploited by an attacker are usually called vulnerabilities. In large dependency trees vulnerabilities can be found deeply nested in packages that you do not directly rely on, but that are dependencies of those packages.

The embodiments herein produce a reliable and efficient way to find the needed updates of directly used packages in a project so that vulnerabilities found in dependencies further down in the tree are fixed. When implemented, the solution should make it easy for users to secure their code. Two strategies were devised and pitted against each other, in order to find out which of them was the most time efficient. The first strategy involves gradually updating the version of a directly used package, that in turn has a vulnerable dependency, until it no longer depends on the harmful code. The second strategy aims to re-create the entire trees of dependencies for all publicly available packages, together with their versions. One could then make requests to the database to find out how the packages should be updated to avoid the vulnerability.

The graph database proved far superior to the gradual updating of packages and allowed one to find a fix for a vulnerability in less than a second, compared to the other solution, which took several seconds and scaled poorly.

Embodiments herein address issues regarding the remediation of vulnerabilities in transitive dependencies when working with open-source. The difficulty in preserving a secure project often lies not only in managing the dependencies that you import and depend on directly, but also in the dependencies of those dependencies. It is these dependencies, often called transitive, or indirect, that make dependency management difficult, since you cannot always decide which dependencies and versions that your direct dependencies rely on. The question then is: if a transitive dependency in a project is found to contain a vulnerability, how does one fix it?

Two embodiments, methods for solving the foregoing problem and bench-marking them against each other, reveal a preferred solution. The first method involves using brute force and building the project several times, each time bumping the version of the dependency that introduced the vulnerable transitive. By doing so, one would hopefully find a version of the direct dependency which no longer uses a vulnerable version of the transitive. The second method is to build a graph database over all dependencies known to exist, as well as their relations to other dependencies, in a graph structure. This enables the use of queries for finding out which version of a direct dependency is the first to no longer use the vulnerable transitive.

In one embodiment, a basic vulnerability remediation strategy that calculates dependency versions that fix vulnerabilities in a brute force manner for code bases using the build in Maven (Apache Maven Project. Pom reference available at "maven.apache.org" is incorporated herein by reference) although other automation tools may be utilized. In another embodiment, a dependency graph database is created containing dependency versions and their relations from the automation tool registry and a solution implemented that communicates with it and uses its data to find remediations.

The graphical solution is benchmarked by computing the time efficiency with regard to the transitive depth of the vulnerable dependency. The transitive depth of the vulnerable dependency is of interest for both solutions. It possibly affects both the number of nodes that need to be traversed in the graph database solution, as well as the time it takes to build the dependency tree in the brute-force solution. By taking measurements on different depths for both solutions, we will be able to derive a rough estimate of their time efficiencies. Using the average dependency depth in Maven as a whole, it is then possible to draw conclusions regarding which solution is preferred.

As an overview, to the following, theory is considered regarding the problem and the two proposed solutions are introduced. An actual implementation of the solution will be considered with results, analysis, and summary.

Open-source software is often described as a piece of code that anyone can see, modify or optimize, due to it being publicly available. Embodiments herein generally focus on dependencies of open-source software, meaning external code that is required for the software to be used. Dependencies differ in their structure and the different types have varying names, such as packages, modules, gems and snaps, etc. In the embodiments herein, an openly published piece of open-source software will be referred to as a package. In other embodiments, a package may include non-open source software (e.g., custom, bespoke, or in-house developed software modules).

Open-source software registries: There are several different approaches for connecting packages throughout open-source. One approach is to wrap the package with defined meta code so that it can be used generically in projects using the same meta code structure. These packages using the same setup can then be published to a central registry store where they can be used by a package manager. One of the larger package managers with such a registry is Maven, which will be described in more detail below.

Dependency trees: During development, one can implement a new package that is built on top of already existing packages. These are often called dependencies to the new package. Later on, this new package might become a dependency to another newly built package. We now have a set of dependencies depending on each other in a chain. The set of dependencies of a dependency is usually called its transitive dependencies. In A B C, A is a package that has a direct dependency B and a transitive dependency C. To B, C is a direct dependency. A package manager is then used for assisting with handling all of these packages and their relations.

The management of transitive dependencies differs a lot. Some package managers do not permit the use of multiple different versions of a dependency, while others do. Some even lock all transitive dependencies to a certain set of versions in order to not get conflicting builds. Maven and Composer are examples of package managers that do not accept multiple versions of the same dependency, while npm (npm community. package-lock.j son available at "docs.npmjs.com/cli/v7/") is incorporated herein by reference) is an example of a package managers that does.

Breaking changes: When actively maintained, packages often receive updates and fixes with differing reasons. It could be because of bugs inside an application programming interface (API) or new functionality that is being added due to new demands or interests. Sometimes parts might no longer be used and could then be removed. Depending on the impact the changes make to the package, users might be affected. If a certain API is changed so that others cannot use it in the same way as before, that is usually called a breaking change.

Package versioning: Due to the complexity of managing a large tree of dependency relations, an issue sometimes faced when packages depend on each other is what is commonly known as "dependency hell." Package versions are often allowed to be declared loosely using, for example, a version interval, or locked to a single version. One can imagine a large tree, where versions are not locked and different packages and their transitive dependencies get automatically updated within the allowed version interval at different points in time. In that case it is difficult to know if the updates will introduce breaking changes to a project. The simple solution to the problem would be to make sure that all packages and their dependencies have locked versions, but at the same time that means that the project will not receive new updates when needed. It also still requires the maintainer to have to do research every time a new version is to be used, in order to make sure that no breaking changes have been introduced.

One common solution for assisting in making it easier to understand what an update means to a project and reducing the risks of dependency hell is Semantic versioning, also known as SemVer (Tom Preston-Werner. Semantic versioning 2.0.0 available at "semver.org" is herein incorporated by reference). Semantic versioning is a rule-set for managing different versions of packages and specifies how these should be incremented/decremented, in order to be transparent about what a change in version will lead to.

The versions in SemVer are divided into "MAJOR.MINOR.PATCH" (for example 2.4.3), where the following scheme is applied:
"MAJOR": Incremented whenever changes to the open API are made in such a way that breaking changes are introduced.
"MINOR": Incremented when new functionality is added to a package that is backwards compatible and will therefore not introduce any breaking changes. Changes in version are allowed within "MAJOR.X"
"PATCH": Incremented when changes that fix bugs are made to already existing functionality in the package. Changes are allowed within "MAJOR.MINOR.x"

SemVer declares that "MAJOR", "MINOR" and "PATCH" should all increase numerically and that each identifier should be a positive integer, without any zeros before the actual integer.

SemVer also describes guidelines for how to compare SemVer defined versions. To determine what version is newer than the other, one must consider the numbers of each section where the major identifiers precede minor identifiers which in turn precede patch identifiers. Formula 1, as one example, is true for SemVer:

$$1.0.0 < 1.0.1 < 1.1.0 < 1.10.1 < 2.1.1 \qquad (1)$$

Maven is a package manager often used for Java projects. It not only covers the management of packages but also has support for setting up other project operations, such as compiling, testing or deploying. These operations are normally done through so called plugins. Maven's main concept is built around the project object model, Project Object Model (POM) and the corresponding file called pom.xml which is a project specification file in XML format. A basic example of a pom.xml with a plugin called maven-compilerplugin and a dependency called maven-artifact can be seen in the following pom.xml example (Formula 2):

```
< project >                                               (2)
    < model Version > 4 . 0 . 0 </ model Version >
    < group Id > com.mycompany.app </ group Id >
    < artifact Id > my - module </ artifact Id >
    < version >1 </ version >
    < build >
        < plugins >
            < plugin >
                < group Id > org.apache.maven . plugins </ group Id >
                < artifact Id > maven - compiler - plugin </ artifact Id >
                < version > 3 . 8 . 1 </ version >
            </ plugin >
        </ plugins >
    </ build >
    < dependencies >
        < dependency >
            < group Id > org.apache.maven </ group Id >
            < artifact Id > maven - artifact </ artifact Id >
            < version > 1 . 2 . 3 </ version >
        </ dependency >
    </ dependencies >
</ project >
```

Defining what dependencies a Maven project requires is done under the tag dependencies. When the project is built according to the POM, the dependencies defined get resolved and downloaded from a defined registry. The default Maven registry is called the Maven Central Repository, however it is possible to within the POM declare other registries that are to be used. Since no other registry has been defined in Formula 2 the dependencies and plugins would be downloaded directly from the Maven Central Repository.

Maven supports have setups with dependencies depending on each other, i.e., transitive dependencies. As previously stated, Maven does not accept several versions of a dependency in the tree. So a dependency x with version y cannot have another version on another depth. Java uses its classpath to resolve imports in projects. This is helpful in the case that the same dependency has two different versions, since they otherwise would end up on the same classpath, making it impossible to know what to reference during compilation.

Maven uses so-called dependency mediation to decide what version will be resolved in the case where two different versions occur as requirements during build time. The one that gets resolved is the one that is closest to the direct dependency in the tree. The Maven project defines it as the nearest definition. An example of how this works is the case when we have a dependency x with version y on level 1 (0 being direct dependencies) and on level 2, the dependency x is required again but this time with version z. Here Maven would use version y since it is closest to the direct dependency level. Because of this functionality, a transitive dependency can always be forced to a certain version if it is declared a direct dependency in the POM declaration.

Software vulnerabilities: Software can be affected by a range of different issues, varying in severity. Some might have devastating effects, while others barely have any impact at all. These issues sometimes result in software vulnerabilities that are exploitable by malicious actors. There are several organizations that try to address or aid in the seemingly never-ending fight between the bug fixers and attackers. One such organization is the National Institute of Standards and Technology (NIST) and their project the National Vulnerability Database (NVD). Some of the contributions made by the project have become standards for managing software vulnerability data. They also host an openly published vulnerability database that matches software packages with vulnerability definitions. The matches describe what versions are vulnerable to a certain weakness, what the issue is and sometimes how it can be addressed. This is either done through code changes or pure upgrades or downgrades of the package. The matched vulnerability is called a CVE, which stands for Common Vulnerabilities and Exposures, and will be described more thoroughly below. NVD uses a definition they call CPE, or Common Platform Enumeration, for defining packages, which will be described below.

CVE (MITRE. Cve requirements available at "cve.mitre.org" are herein incorporated by reference): As mentioned above, NVD has chosen the CVE identifier for vulnerabilities in their database of package-vulnerability matches. CVE has become a widely used identifier for a specific vulnerability in information technology systems. The standard is published and maintained by the MITRE Corporation which has copyrighted it. A CVE Entry must include the following:

The name of the package affected by it.
The version(s) of the package that is affected or that fixes the vulnerability.
A CVE ID, for example CVE-2021-1337.
One of either vulnerability type, root cause or impact.
At least one public reference.
A prose description.
An indication of whether or not the vulnerability only affects products that have stopped being supported.

CPE (NIST. Official common platform enumeration (cpe) dictionary, available at "csrc.nist.gov" is herein incorporated by reference): A CPE, or Common Platform Enumeration, is another information security related standard. This standard is used to generalize and identify software packages though naming. It is published and held by NIST which have also published a CPE dictionary for packages. A CPE identifier contains, among other things, the following:

The version of the CPE standard used.
Related programming language or runtime environment.
The name of the vendor.
The name of the package/product.
Version of the package.

Formula 3 illustrates an example of CPE that could be the following JavaScript package called lodash that has the SemVer version 0.1.0:

$$cpe{:}2.3{:}a{:}lodash{:}lodash{:}0.1.0{:}^*{:}^*{:}^*{:}^*{:}node.js{:}^*{:}^* \quad (3)$$

When specified in a CVE, a CPE can sometimes be more general, by having an asterisk "*" in the version tag as well. This would mean that all versions of that package are affected by the CVE. Another example often used by NVD is specifying a version interval, within which a package is vulnerable.

Relational Databases: A relational database consists of data stored in tables containing rows that represent records and columns that represent attributes. It is based on the relational model conceived by E. F. Codd in 1970. The ideas behind the relational spawned from an era where storage was both limited and expensive and therefore data needed to be compressed. The relational database is still to this day effective and useful in a lot of situations where relationships are of the one-to-one, one-to-many or many-to-one sort, but when it comes to many-to-many relations, the performance tends to leave a lot to be desired.

MySQL: MySQL is an example of a relational database management system using SQL as language for creating queries. It can hold a variety of different data types, which are defined in the table where the data is stored. In a MySQL database, primary keys and foreign keys are used in order to define relationships between tables. Due to these relationships being highly connected, it can result in issues with performance for larger databases. The more tables and larger a relational database is, the more joins are often required for retrieving the data, resulting in higher query retrieval times.

Graph Databases: A graph database is an alternative to the traditional relational database, consisting of nodes and edges. It is part of a family of databases called NoSQL which, unlike relational databases, do not use links between tables to define relationships, allowing one to access objects in a quick and simple way, due to the explicit direct relations between data and lack of expensive table joins. The concept also allows for bidirectional edges. Data structure 700 of FIG. 7 illustrates an example Neo4J graph where the top relation between John and Katie is bidirectional, while the relations between the people and the proficiencies are unidirectional. All the edges in the example contain properties, allowing for more advanced queries to be used to fetch data. Neo4J uses the cypher query language for both the creation and retrieval of nodes and edges in its database. The cypher language allows for a wide variety of operations, and the creation of the graph in graph 700 of FIG. 7 can be done through the queries shown in Formula 4. In the figure, there are also queries for retrieving data from the graph.

```
// Create nodes                                                             (4)
CREATE (x: Person { name : " John "});
CREATE (x: Person { name :" Katie "});
CREATE (x: Language { name :" French "});
CREATE (x: Instrument { name :" Guitar "});
// Create edges
MATCH (x : Person), (y : Person) WHERE x.name = ' John '
AND y.name = ' Katie ' CREATE (x) -[ r: Friends (Duration\_months):5)]->(y);
MATCH (x: Person), (y: Person) WHERE x. name = ' John ' AND y.name = ' Katie '
CREATE (x) <-[ r: Friends (Duration \_ months):5)]-(y);
MATCH (x: Person), (y: Language) WHERE x. name = ' John ' AND y. name = '
French ' CREATE (x)-[ r: Proficiency { Skill_ level: ' Fluent '}]->(y);
MATCH (x: Person), (y: Instrument) WHERE x. name = ' John ' AND y. name = '
Guitar ' CREATE (x)-[ r: Proficiency { Skill_ level: ' Novice '}]->(y);
MATCH (x: Person), (y: Instrument) WHERE x. name = ' Katie ' AND y. name = '
Guitar ' CREATE (x)-[ r: Proficiency { Skill_ level: ' Professional '}]->(y);
// Retrieving data
MATCH (x: Person { name :" John "}) -[ skills: Proficiency ]->(y) RETURN skills; //
Returns the " French " and " Guitar" nodes
MATCH (x) -[ friendship : Friends ]-(y: Person { name: " John "}) WHERE friendship .
Duration_ months > 4 RETURN x;
// Returns the " Katie" node
``` of graph databases was developed as a way of effectively handling many-to-many relations and making it easy to model and traverse data with high performance capabilities.

Components: Unlike primary and foreign keys in a relational database, the edges in a graph database define the relationship between the nodes in a node-edge-node pattern. Both the nodes and the edges are able to have properties and labels assigned to them that help describe both what the node represents and the necessary information about the node's relation to other nodes. To give an example of why this is often very useful when creating a graph database, we can consider a graph database that has nodes describing both people and different physical and conceptual objects. If we want to describe that a person "John" is fluent in French, we could add a node with the label "person" and property "name: John", another node with the label "language" and property "name: French" and an edge with the label "is fluent in", connecting the two nodes. If we were to populate the database with several other nodes and relationships we would then be able to easily query the database to find all languages that John is fluent in. Due to the fact that edges are allowed to have properties, we could further develop this and rename the label of the edge to "proficiency" and instead include the property "skill level: fluent". By doing this we are now able to do a single simple query and get all John's proficiencies in one go. In the same database, other types of objects and relationships could be added with similar functionality by using properties and labels.

Neo4J is an example of a graph database management system that uses nodes, edges and properties to build a graph structure. It supports the labeled property graph model, allowing nodes and edges to have several different labels. It In another embodiment, implementation of the two remediation strategies is disclosed. Each strategy will have its own relying infrastructure, described in the first section of both strategies. An in-depth description of each strategy will then follow.

Briefly, and in one embodiment, remediation using a brute force strategy aims to continuously "bump" the version of the direct dependency that transitively has imported a vulnerable dependency. This is to be done until a version of the direct dependency is found that has either removed the vulnerable transitive dependency or has changed its version to one outside of the vulnerable range. By making as small changes as possible between each bump we would, for versions using SemVer, reduce the risk of breaking changes, since we would prioritize patches and minor version changes over major version changes.

In another embodiment, the second strategy involves creating a graph database, containing available Maven dependency versions and their relations. A way of querying it also needs to be implemented in order to find the root dependency versions required to fix a vulnerability. By finding root dependencies that are either not related to the vulnerable transitive dependency or related to a safe version of it.

In one example, Python 3.9 (Python Software Foundation. Welcome to Python, available at "www.python.org" is herein incorporated by reference) with a microframework called Flask (Flask. "Flask foreword" available at "flask.palletsprojects.com/en/2.0.x/foreword" is herein incorporated by reference) is used to implement the application communicating with the graph database. Flask is designed as a standalone application reachable through a number of REST API endpoints. In order to be able to queue repository scan requests, Redis (Redis labs. Redis available at "redis.io" is herein incorporated by reference) queue may be implemented and Docker with the tool Docker Compose (Inc. Docker. Docker and Docker compose available at "www.docker.com" is herein incorporated by reference) may be utilized to package the application into three different containers, one for the flask app, one for the Redis queue and one for Neo4j.

Design: Flask: The graph database solution parses dependencies and relations from Maven projects, and fetches those results when adding it to the graph. When adding a package to the graph, the first step is to find the direct dependencies of that particular package. This varies for different package managers, for NPM their public API is used and for Maven the pom.xml files are downloaded. This data/file is parsed and the direct dependencies are found. If no specific version is set for the dependency, but rather a version range, all potential dependency versions within the version range are added as dependencies.

Once they have been fetched, they are translated into Dependency and Relation entities and then inserted into the Neo4j graph. The communication between python and the graph is possible with the use of the py2neo library.

Neo4j: After having received the information needed from the scanned repository, we iterate through the data, adding the appropriate nodes and relations when needed. We do not allow duplicates in the graph, so if a certain node already exists, we do not add it, and instead only add the potential new relations, if any exist. Therefore all repositories which are scanned are interconnected when needed and the end result is a large graph with nodes for all dependencies parsed and edges for all relationships. Py2neo is not only used for adding new nodes and relationships to the graph, but also for getting the appropriate data when needed. Through an API it is possible to fetch certain data, in order to find the remediating version of a dependency. Based on the fact that NVD often defines vulnerabilities through a vulnerable interval, we have created a main API endpoint to be used for the remediation. This takes the name of the direct dependency and the vulnerable transitive dependency, as well as the vulnerable version interval as input. This is used when the vulnerability is within a certain interval, and the graph is queried to find a version of a direct dependency where that specific transitive dependency is either outside of that interval, or is not interconnected with it.

Graph database: Generally, graphing should be as simple as possible and therefore only include the minimum required to accomplish the task of remediating vulnerabilities. A node contains two properties, a name and a version and nodes related to each other through a relation called "TRANSITIVE OF" without any properties, which points upwards in the graph and a relation called "USES" without any properties, which points downwards in the graph. This is done so that we can traverse the graph from a safe transitive dependency version up towards the direct dependencies which depend on it and that remediates the vulnerability. The format of a CVE on NVD often contains a vulnerable interval or specific vulnerable version. Due to this fact, we have two main queries for getting a root fix from the graph database:

1. A query which takes the name of the vulnerable transitive and the direct dependency, along with the vulnerable interval. This is used to query the graph structure to find a direct dependency that resolves a safe (previously vulnerable) transitive dependency, meaning that the transitive dependency version is outside the vulnerable version range.

Different package managers, such as NPM, Maven, and Composer, resolve transitive dependencies in different ways, as described above, which results that the query to find the safe direct dependency must adapted to each specific package manager.

For Maven (Java), the first step is to find all potential direct dependency versions, candidates, that are equal to or larger than the provided direct dependency version.

In the second step, for each candidate, a shortest path graph search algorithm is used to find the most shallow occurrences, candidate-targets, (multiple versions of the vulnerable dependency) of the vulnerable transitive dependency in the dependency graph. If the largest version of the candidate-targets is outside of the vulnerable version range, the candidate direct dependency is regarded as safe.

For NPM (JavaScript), the first step is equivalent to that of Maven.

In the second step, for each candidate, a max path traversal graph algorithm is used to find all potentially resolved versions of the vulnerable transitive dependency, candidate-targets. If all candidate-targets are outside of the vulnerable version range, the direct dependency is deemed as safe.

The max path traversal algorithm traverses the graph by pruning impossible paths in the graph, to increase the efficiency in the search. For each node, it only traverses max versions of each unique package that are related to the current node through the USES relationship.

2. A query which takes the name of the vulnerable transitive and the direct dependency and finds all direct dependency versions where the transitive does not exist. This works well in conjunction with query 1 if the transitive was added or removed at a certain point in the direct dependency's version history.

The remediation time for simulations on the minimal graph proved, unlike the brute force strategy, not to be as clearly dependent on the depth of the remediation. The fairly high standard deviation made it difficult to draw any clear connections between depth and time. The simulations did, however, show that a remediation in the minimal graph is a lot more efficient than the brute force strategy. We were also interested in seeing how well the graph solution scaled. Since the Maven Central Repository according to our scraping contained 6,624,270 versions, the graph in its final form would require as many nodes in order to create the full Maven dependency tree for use in production.

When observing the results from the brute force strategy simulations, it is found that the time spent on remediating increases from one depth to the next with an average of 0.99 seconds, with the lowest value being 0.58 seconds and the highest 1.52 seconds. This gives an idea of the time it takes to fetch a dependency from our registry and use it in a build. For depth 0, it only has to fetch a single dependency, but it also builds the prerequisites for a skeleton project. By subtracting the mean time it takes to fetch a dependency (0.99 seconds) from the time it took to remediate in depth 0 (approx. 5.254 seconds), it can be assumed that creating the needed parts for a Maven skeleton projects to build, takes around 4.26 seconds. This is already a lot longer than any graph remediation result.

When conducting simulations for the different graph sizes, it was found that increasing the size of the graph had a profound effect on the time it took to find a remediation. This is believed to be both due to the fact that the database is larger, but even more so because we used the same dependency names, but with unique versions, for all dependencies we added. This means that the query found a matching name (but not a matching version) in all dependency chains. This is an unrealistic scenario since a Maven package has on average approximately 17 published versions, but we decided to do so, since the graph proved to be so much faster in regard to remediation time and we wanted to simulate if it was possible to reach a point where the best case brute force remediation would be better, in regard to time, than the graph solution. This was also useful due to the fact that we did not test adding 1,000,000 and 10,000,000 nodes to the graph.

An object of the embodiments herein is to identify a solution for remediating vulnerabilities in transitive dependencies in open-source. The solutions described by the embodiments herein provided a solution that is less affected by the depth of the vulnerable transitive dependency when compared to a brute force strategy and was overall faster. The solutions herein are scalable, such as to contain all Maven packages. Even with a total of 100,000 nodes, the graph database solution herein are able to outperform the brute force strategy by a substantial margin.

These and other needs are addressed by the various embodiments and configurations of the present invention. The present invention can provide a number of advantages depending on the particular configuration. These and other advantages will be apparent from the disclosure of the invention(s) contained herein.

Exemplary aspects are directed to:

A system to remediate a software fault, comprising: a processor coupled with a computer memory comprising computer readable instructions to cause the processor to perform: accessing a list of packages each comprising a portion of a software application wherein at least one of the list of packages is required by at least one other of the list of packages and each of the list of packages is identified by a compatible version; accessing a list of faulty packages comprising at least one of the list of packages that has a known fault and a corresponding faulty version number; and mapping a safe build list for the target software to comprise each of the list of packages and for each package of the list of packages a corresponding version number selected from the compatible version but that excludes any faulty version number.

A method to remediate a software fault, comprising: accessing a list of packages, each comprising a portion of a software application wherein at least one of the list of packages is required by at least one other of the list of packages and each of the list of packages is identified by a compatible version; accessing a list of faulty packages comprising at least one of the list of packages that has a known fault and a corresponding faulty version number; and mapping a safe build list for a target software to comprise each of the list of packages and for each package of the list of packages a corresponding version number selected from the compatible version but that excludes any faulty version number A system, comprising: means to access a list of packages, each comprising a portion of a software application wherein at least one of the lists of packages is required by at least one other of the lists of packages and each of the list of packages is identified by a compatible version; means to access a list of faulty packages comprising at least one of the lists of packages that has a known fault and a corresponding faulty version number; and means to map a safe build list for a target software to comprise each of the lists of packages and for each package of the list of packages a corresponding version number selected from the compatible version but that excludes any faulty version number.

A system on a chip (SoC) including any one or more of the above embodiments or aspects of the embodiments described herein.

One or more means for performing any one or more of the above embodiments or aspects of the embodiments described herein.

Any aspect in combination with any one or more other aspects.

Any one or more of the features disclosed herein.

Any one or more of the features as substantially disclosed herein.

Any one or more of the features as substantially disclosed herein in combination with any one or more other features as substantially disclosed herein.

Any one of the aspects/features/embodiments in combination with any one or more other aspects/features/embodiments.

Use of any one or more of the aspects or features as disclosed herein.

Any of the above embodiments or aspects, wherein the data storage comprises a non-transitory storage device, which may further comprise at least one of: an on-chip memory within the processor, a register of the processor, an on-board memory co-located on a processing board with the processor, a memory accessible to the processor via a bus, a magnetic media, an optical media, a solid-state media, an input-output buffer, a memory of an input-output component in communication with the processor, a network communication buffer, and a networked component in communication with the processor via a network interface.

It is to be appreciated that any feature described herein can be claimed in combination with any other feature(s) as described herein, regardless of whether the features come from the same described embodiment.

The phrases "at least one," "one or more," "or," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B, and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an embodiment that is entirely hardware, an embodiment that is entirely software (including firmware, resident software, micro-code, etc.) or an embodiment combining software and hardware aspects that may all generally be referred to herein as a "circuit," "module," "package," "application," or "system." Any combination of one or more computer-readable medium(s) may be utilized. The computer-readable medium may be a computer-readable signal medium or a computer-readable storage medium.

A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible, non-transitory medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable medium may be transmitted using any appropriate medium, including, but not limited to, wireless, wireline, optical fiber cable, RF, etc., or any suitable combination of the foregoing.

The terms "determine," "calculate," "compute," and variations thereof, as used herein, are used interchangeably and include any type of methodology, process, mathematical operation or technique.

The term "means" as used herein shall be given its broadest possible interpretation in accordance with 35 U.S.C., Section 112(f) and/or Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The preceding is a simplified summary of the invention to provide an understanding of some aspects of the invention. This summary is neither an extensive nor exhaustive overview of the invention and its various embodiments. It is intended neither to identify key or critical elements of the invention nor to delineate the scope of the invention but to present selected concepts of the invention in a simplified form as an introduction to the more detailed description presented below. As will be appreciated, other embodiments of the invention are possible utilizing, alone or in combination, one or more of the features set forth above or described in detail below. Also, while the disclosure is presented in terms of exemplary embodiments, it should be appreciated that an individual aspect of the disclosure can be separately claimed.

BRIEF DESCRIPTION OF THE DRAWINGS

The present disclosure is described in conjunction with the appended figures.

DETAILED DESCRIPTION

Figure 1:
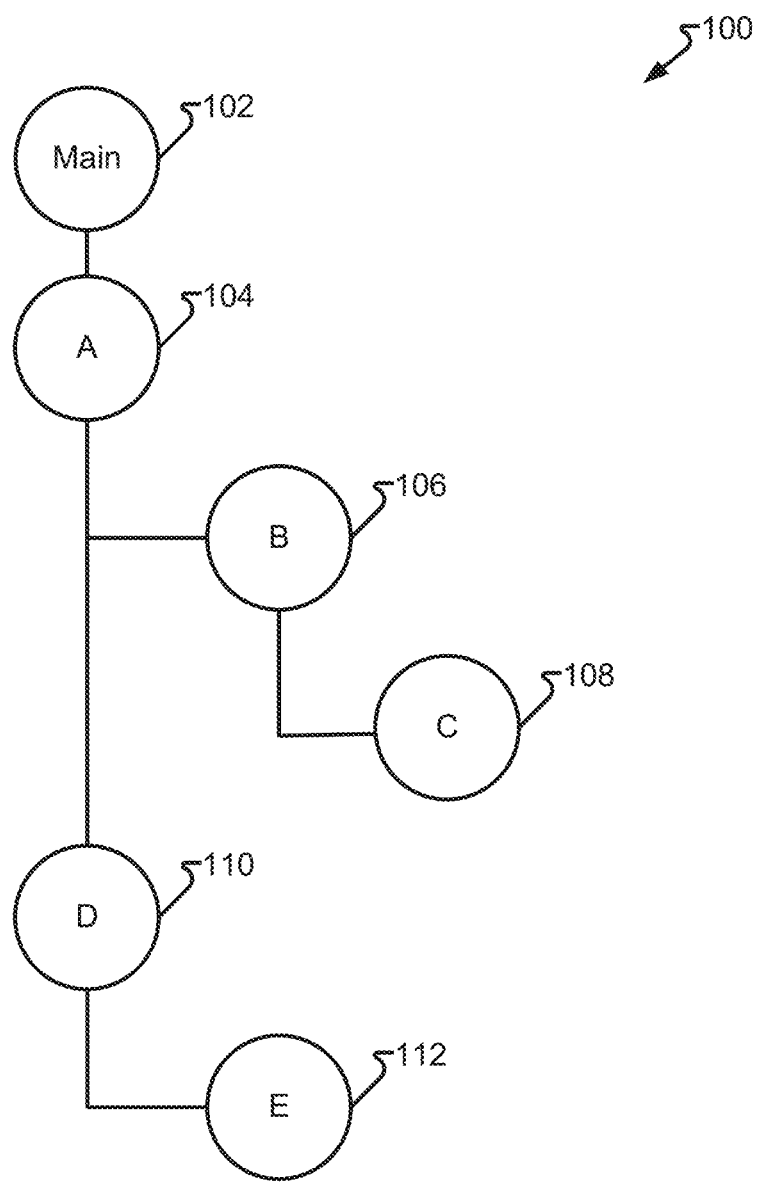
FIG. 1 depicts a tree diagram in accordance with embodiments of the present disclosure.

The ensuing description provides embodiments only and is not intended to limit the scope, applicability, or configuration of the claims. Rather, the ensuing description will provide those skilled in the art with an enabling description for implementing the embodiments. It will be understood that various changes may be made in the function and arrangement of elements without departing from the spirit and scope of the appended claims.

Any reference in the description comprising a numeric reference number, without an alphabetic sub-reference identifier when a sub-reference identifier exists in the figures, when used in the plural, it is a reference to any two or more elements with the like reference number. When such a reference is made in the singular form, but without identification of the sub-reference identifier, is a reference to one of the like numbered elements, but without limitation as to the particular one of the elements being referenced. Any explicit usage herein to the contrary or providing further qualification or identification shall take precedence.

The exemplary systems and methods of this disclosure will also be described in relation to analysis software, modules, and associated analysis hardware. However, to avoid unnecessarily obscuring the present disclosure, the following description omits well-known structures, components, and devices, which may be omitted from or shown in a simplified form in the figures or otherwise summarized.

For purposes of explanation, numerous details are set forth in order to provide a thorough understanding of the present disclosure. It should be appreciated, however, that the present disclosure may be practiced in a variety of ways beyond the specific details set forth herein.

Software applications range from the simple, such as common "Hello, World" example, to exceptionally massive. One of the key advantages of software is reusability. There is no need to "reinvent the wheel" if the "wheel" already exists. For example, an accounting application may incorporate existing drivers to format tables for display or printing. The developer need only select and include the appropriate driver. Open-source software is one readily available pool of modules that may be incorporated, linked, or accessed at run-time by an application. Often including one package may require the inclusion of other packages. For example, a 3-D drawing application may include a package to render a cube, which in turn includes packages to render 3-D facets, which in turn includes packages to shading gradients, and so on. But while some package dependencies may be used to provide more granular functions of higher-level features, other dependencies may add different, even advanced features. For example, an accounting program may include a package to perform complex calculation or obtain currency conversion data.

Software, especially large applications, are rarely static. The overall application and/or any of the packages may be modified to add new features, fix bugs, improve performance, etc. Generally, when a new build of an application is made, the latest version of the packages are the preferred versions. However, there are compatibility issues than may require a version other than the latest version, such as when a package is updated by one entity but an application utilizes a parent package that has not been modified and, when incorporating the updated child package, would have a fault. Faults include, but are not limited to, executable fault (e.g., access a variable or address that no longer exists, an API call to obtain an integer returns a string, etc.), a computational fault (e.g., divide by zero, use a wrong input, etc.), compile/link faults (e.g., a package is renamed or removed), security fault, etc. Security faults may be obvious (e.g., a password check that includes a hardcoded "back door") or hidden (e.g., entering a hundred-digit number into a telephone number field causes an overflow and exposes data or control to unauthorized persons or systems). The forgoing examples are merely a portion of the faults that may be present in a particular package. Once a fault is identified, merely fixing the fault may not be an option and the faulty package may need to be excluded from the application.

Faulty packages may have non-faulty versions as faults may be nefariously or accidentally introduced during a subsequent attempt to make a new version of a package. As a result, and while it may be generally preferred to always include the latest version of every package, utilizing an earlier version may allow the application to remain functional and omit the fault. Accordingly, it is one objective of the embodiments herein to define the systems and processes to allow software to be built with only compatible versions of all packages while excluding versions of packages having a fault. Automated systems are often utilized to build an application and, as a benefit of the embodiments herein, the automated systems may be configured to only build software applications that are functional and devoid of known faults.

FIG. 1 depicts tree diagram 100 in accordance with embodiments of the present disclosure. It should be appreciated that the relational diagrams, which include tree diagram 100, are graphical representations of data structures maintained in a computer system and illustrated graphically solely as an aid to human understanding. In one embodiment, tree diagram 100 illustrates packages of a software application.

In one embodiment, application 102 requires package A (104), which in turn requires package B (106), which in turn requires package C (108). Application 102 also requires package D (110) which in turn requires package E (112).

Figure 2:
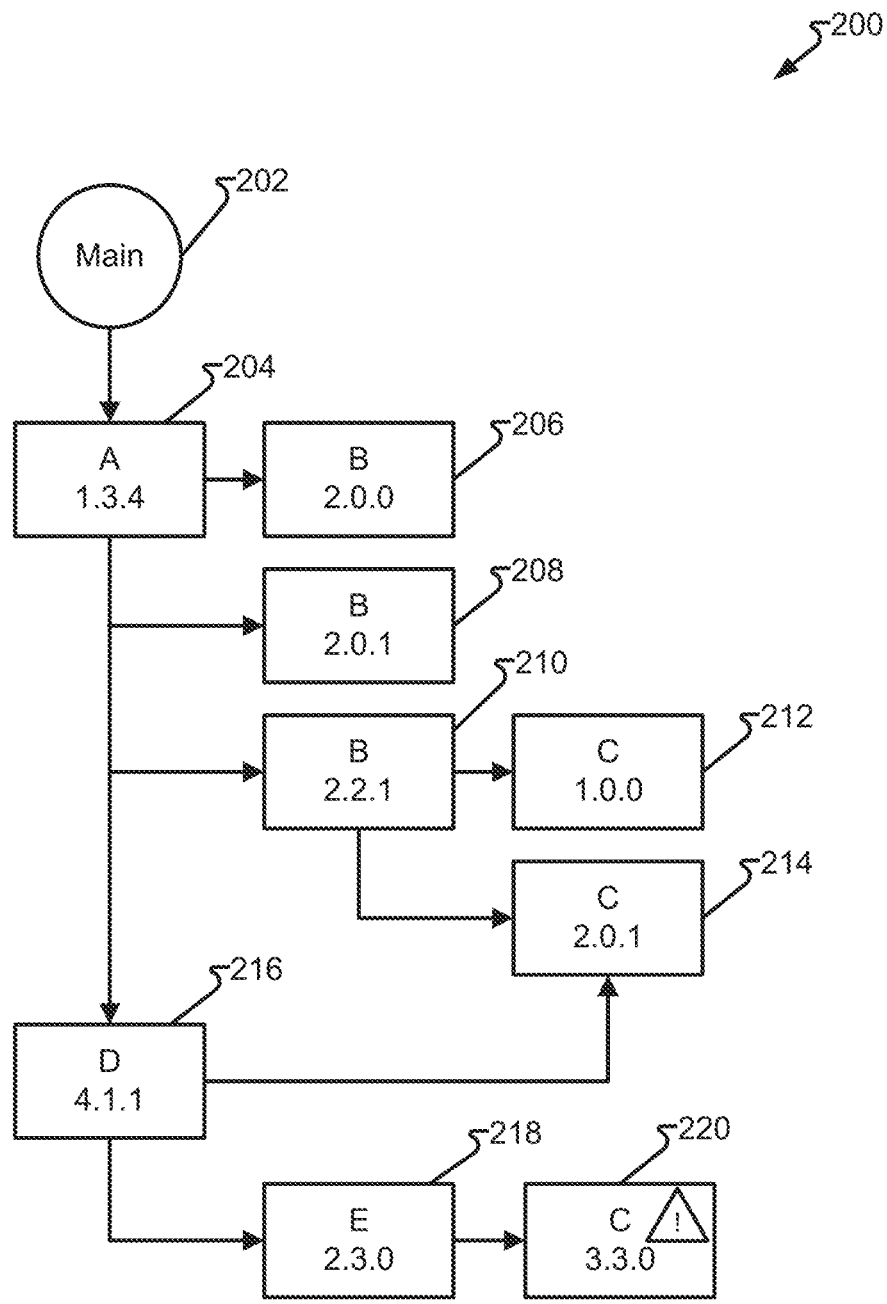
FIG. 2 depicts a tree diagram in accordance with embodiments of the present disclosure.

FIG. 2 depicts tree diagram 200 in accordance with embodiments of the present disclosure. It should be appreciated that the relational diagrams, which include tree diagram 200, are graphical representations of data structures maintained in a computer memory and illustrated graphically solely as an aid to human understanding. In one embodiment, tree diagram 200 builds on tree diagram 100, tree diagram 200 illustrates more details about the packages and their versions and required versions for child packages.

Tree diagram 200 graphically illustrates data structures 202, 204, 206, 208, 210, 212, 214, 216, 218, and 220 and dependencies therebetween. In one embodiment, the main application 202 is dependent upon (i.e., requires) package A version 1.3.4 (204) having a and package D version 4.1.1 (216). In turn, package A (204) requires any one of a number of versions of package B, namely package B version 2.0.0 (206), package B version 2.0.1 (208), or package B version 2.2.1 (210). Versions of package B (206, 208) have no further dependencies, however, if package B version 2.2.1 (210) requires either package C 1.0.0 (212) or package C 2.0.1 (214).

Main application 204 further requires package D version 4.1.1 (216) which, in turn, requires package C version 2.0.1 (214) and package E version 2.3.0 (218). In another embodiment, such as to illustrate a conflict, package E version 2.3.0 (218) requires package C version 3.3.0 (220). However, package C 3.3.0 (220) is not one of the versions required by package B version 2.2.1 (210).

An application that comprises a conflict may be identified as unbuildable or at least not buildable without including known or potential faults. However, had package E version 2.3.0 (218) required package C version 2.0.1 (214), then the application may be built without known faults.

Figure 3:
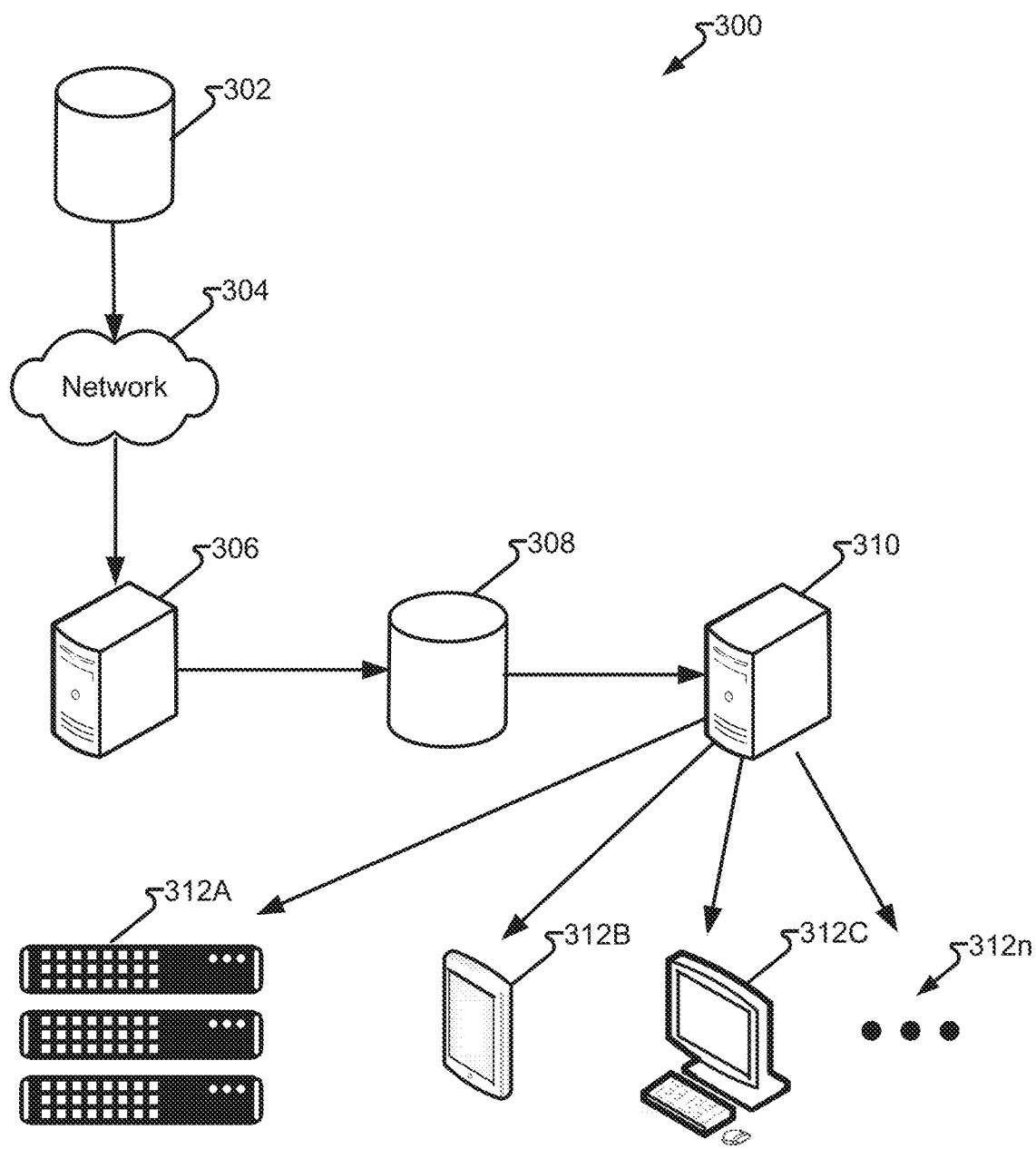
FIG. 3 depicts a system in accordance with embodiments of the present disclosure.

FIG. 3 depicts system 300 in accordance with embodiments of the present disclosure. In one embodiment, server 306 obtains a package (e.g., open-source package) from data storage 302 access via network 304. A process executed by at least one processor of server 306 then maps a safe build list comprising required versions of each package. Required versions comprise the functionality required by another package or the main software application. The required version comprises identified versions of a package that have the required features, such as the functions that will be called, the parameters of the function, and the returned value or other operation is required or, at least, compatible with those required by the parent package and/or software application. The software application may include a root executable function (e.g., "main( )"), custom code, or code that is absent from the included software (e.g., open-source packages).

Server 306 utilizes at least one processor to traverse a computer memory comprising data records to maintain a data structure in a hierarchical order, such as a graphical tree structure (e.g., tree structure 100, tree diagram 200). Server 306 traverses the graphical tree structure to select nodes that are both available but excludes nodes with a known fault. Server 306 then provides a build list to data storage 308.

In another embodiment, build server 310 automatically builds the software application specified by the build list retrieved from data storage 308. As a further embodiment, build server 310 may automatically provide the built software application to any of one or more devices 312A-n to execute the software. Devices 312 may comprise any number of heterogeneous or homogeneous devices including, but not limited to, rack server 312A, mobile device 312B, personal computer 312C, and/or other devices configured to receive the software application for execution.

Figure 4:
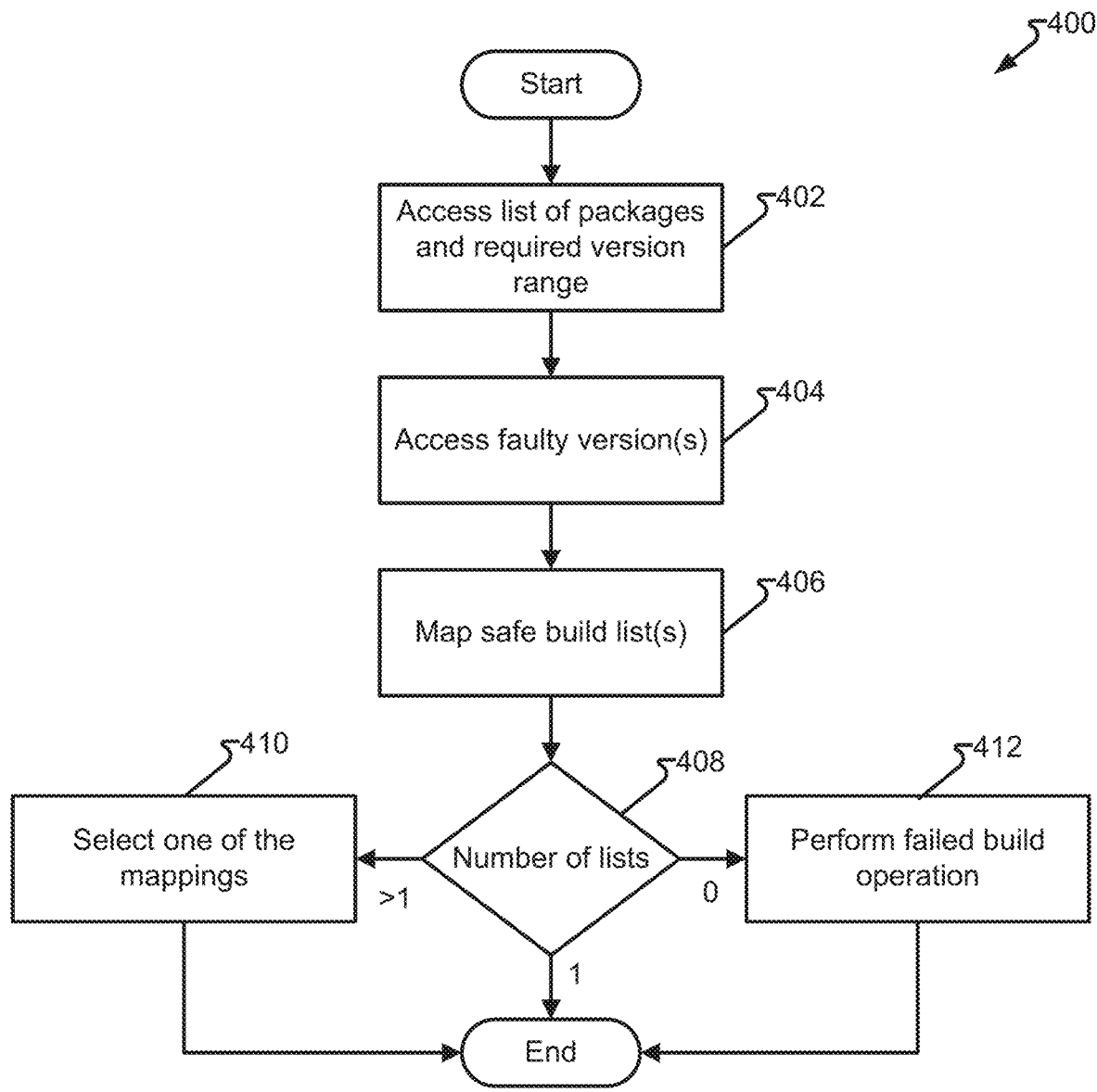
FIG. 4 depicts a process in accordance with embodiments of the present disclosure.

FIG. 4 depicts process 400 in accordance with embodiments of the present disclosure. In one embodiment, process 400 is embodied as machine-executable instructions maintained in a non-transitory computer memory that, when executed, such as by at least one processor of a server (e.g., server 306, server 310, etc.), cause the at least one processor to perform the steps of process 400.

Process 400 begins and, at step 402, accesses a list of packages and required version or versions (e.g., one or more ranges) of each of the packages therein. Step 404 accesses faulty versions for any of the packages in the list of packages. Step 406 builds a hierarchical graphical tree structure and traverses the graphical tree structure and produces one or more lists of mappings through the nodes of the tree to comprise all required versions but omitting any faulty versions. Optionally, upon mapping of the first path through the graphical tree structure, a build list is produced that maps a path through the required, and fault-free, nodes to build the software application and process 400 ends. Optionally, process 400 continues to test 408 which is then executed to evaluate the number of solutions (i.e., mappings) produced in step 406. If test 408 determines there is one list, process 400 ends. If test 408 determines there are more than one list exists, process 410 selects one of the lists. Step 410 may select a list having the most recent version of one or more packages, a list that produces the most compact executable, a list that produces a faster executable, a list that produces a least resource intensive executable, a list that produces a minimal version upgrade and/or other optimization.

If test 408 determines no list are produced, step 412 performs a failed build operation. Step 412 may alert another component that the build failed due to an absence of lists through the tree without including at least one faulty package version. Step 412 may allow for an override and thereby provide a list of the packages but appropriately labeled (e.g., inserted as a comment into a source code file, inserted as a warring for presentation during run-time, etc.) to alert a user that the software application has at least one known fault.

Figure 5:
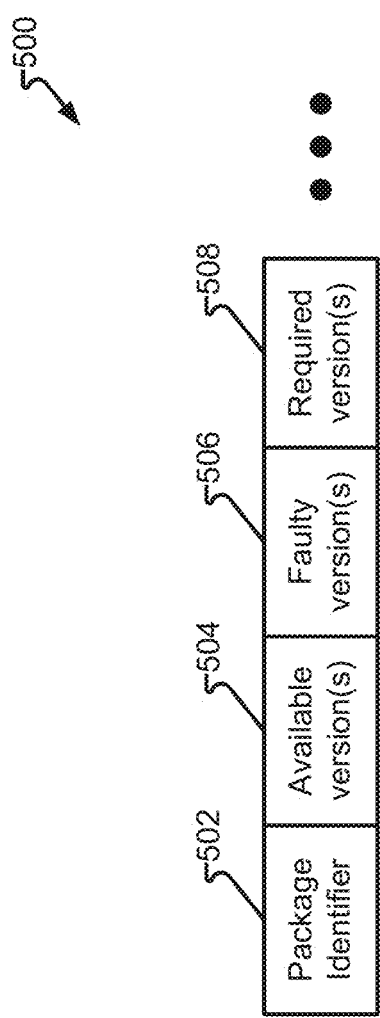
FIG. 5 depicts a data structure in accordance with embodiments of the present disclosure.

FIG. 5 depicts data structure 500 in accordance with embodiments of the present disclosure. Embodiments herein include the development of a hierarchical structure, such as a graphical tree, that a processor would build in a computer memory. In one embodiment, each node of the structure represents a package which may be the software application itself (e.g., the root application) or the packages required by the software application or any number of iterations of packages required by other packages.

In one embodiment, data structure 500 defines the fields for each node in the graphical structure. Data structure 500 may comprise a number of fields, including, package identifier 502 (e.g., name, indicia, sequence number, address on a network, etc.), available versions 504 that are known to a particular system, faulty version(s) 506, and required version(s) 508. Other fields may be included as a matter of design choice.

Figure 6:
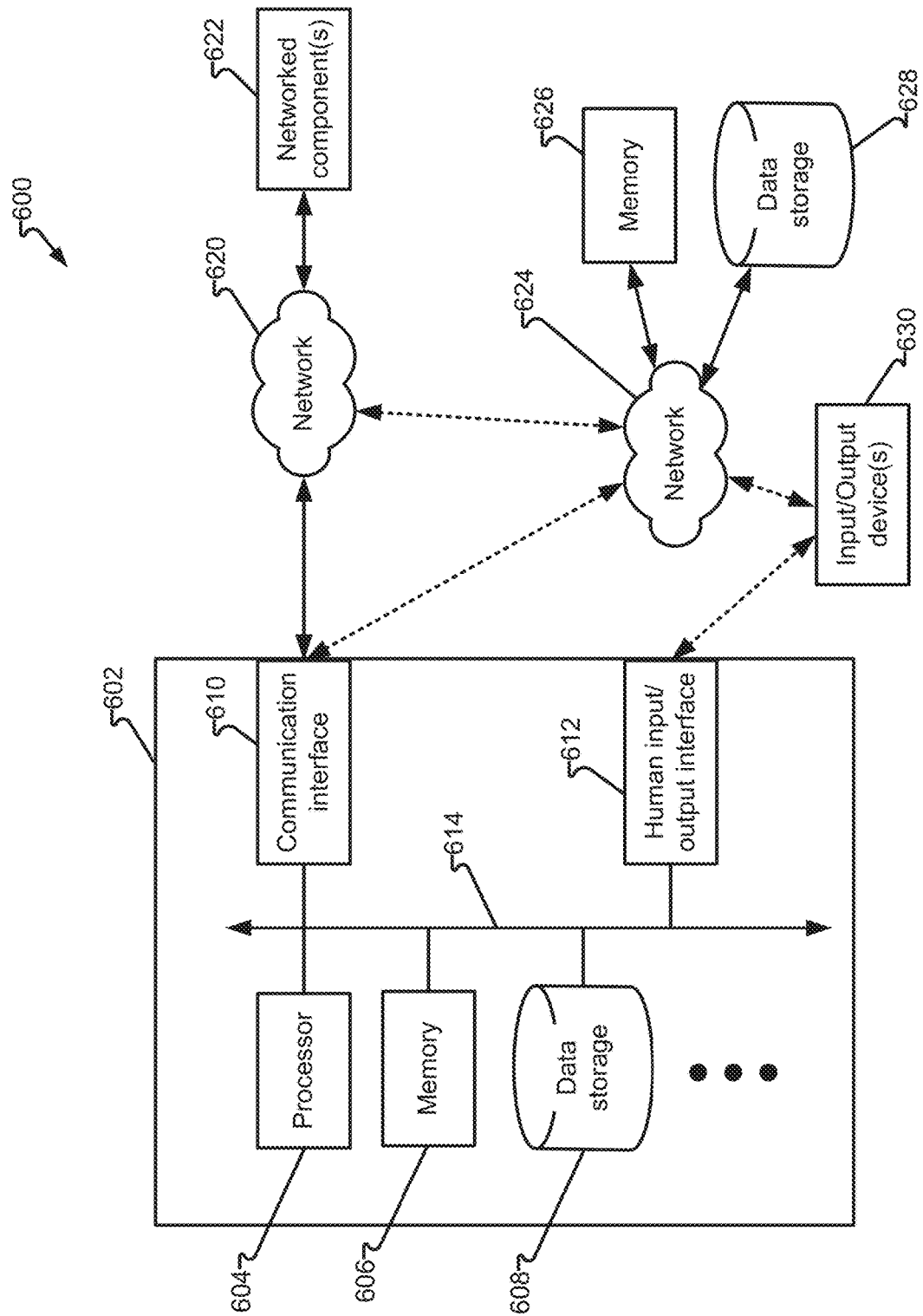
FIG. 6 depicts a system in accordance with embodiments of the present disclosure.

FIG. 6 depicts device 602 in system 600 in accordance with embodiments of the present disclosure. In one embodiment, such as server 306 and/or server 310 may be embodied, in whole or in part, as device 602 comprising various components and connections to other components and/or systems. The components are variously embodied and may comprise processor 604. The term "processor," as used herein, refers exclusively to electronic hardware components comprising electrical circuitry with connections (e.g., pin-outs) to convey encoded electrical signals to and from the electrical circuitry. Processor 604 may comprise programmable logic functionality, such as determined, at least in part, from accessing machine-readable instructions maintained in a non-transitory data storage, which may be embodied as circuitry, on-chip read-only memory, computer memory 606, data storage 608, etc., that cause the processor 604 to perform the steps of the instructions. Processor 604 may be further embodied as a single electronic microprocessor or multiprocessor device (e.g., multicore) having electrical circuitry therein which may further comprise a control unit(s), input/output unit(s), arithmetic logic unit(s), register(s), primary memory, and/or other components that access information (e.g., data, instructions, etc.), such as received via bus 614, executes instructions, and outputs data, again such as via bus 614. In other embodiments, processor 604 may comprise a shared processing device that may be utilized by other processes and/or process owners, such as in a processing array within a system (e.g., blade, multi-processor board, etc.) or distributed processing system (e.g., "cloud", farm, etc.). It should be appreciated that processor 604 is a non-transitory computing device (e.g., electronic machine comprising circuitry and connections to communicate with other components and devices). Processor 604 may operate a virtual processor, such as to process machine instructions not native to the processor (e.g., translate the VAX operating system and VAX machine instruction code set into Intel® 9xx chipset code to enable VAX-specific applications to execute on a virtual VAX processor). However, as those of ordinary skill understand, such virtual processors are applications executed by hardware, more specifically, the underlying electrical circuitry and other hardware of the processor (e.g., processor 604). Processor 604 may be executed by virtual processors, such as when applications (i.e., Pod) are orchestrated by Kubernetes. Virtual processors enable an application to be presented with what appears to be a static and/or dedicated processor executing the instructions of the application, while underlying non-virtual processor(s) are executing the instructions and may be dynamic and/or split among a number of processors.

In addition to the components of processor 604, device 602 may utilize computer memory 606 and/or data storage 608 for the storage of accessible data, such as instructions, values, etc. Communication interface 610 facilitates communication with components, such as processor 604 via bus 614 with components not accessible via bus 614. Communication interface 610 may be embodied as a network port, card, cable, or other configured hardware device. Additionally or alternatively, human input/output interface 612 connects to one or more interface components to receive and/or present information (e.g., instructions, data, values, etc.) to and/or from a human and/or electronic device. Examples of input/output devices 630 that may be connected to input/output interface include, but are not limited to, keyboard, mouse, trackball, printers, displays, sensor, switch, relay, speaker, microphone, still and/or video camera, etc. In another embodiment, communication interface 610 may comprise, or be comprised by, human input/output interface 612. Communication interface 610 may be configured to communicate directly with a networked component or configured to utilize one or more networks, such as network 620 and/or network 624.

Network 304 may be embodied, in whole or in part, as network 620. Network 620 may be a wired network (e.g., Ethernet), wireless (e.g., WiFi, Bluetooth, cellular, etc.) network, or combination thereof and enable device 602 to communicate with networked component(s) 622. In other embodiments, network 620 may be embodied, in whole or in part, as a telephony network (e.g., public switched telephone network (PSTN), private branch exchange (PBX), cellular telephony network, etc.).

Additionally or alternatively, one or more other networks may be utilized. For example, network 624 may represent a second network, which may facilitate communication with components utilized by device 602. For example, network 624 may be an internal network to a business entity or other organization, whereby components are trusted (or at least more so) than networked components 622, which may be connected to network 620 comprising a public network (e.g., Internet) that may not be as trusted.

Components attached to network 624 may include computer memory 626, data storage 628, input/output device(s) 630, and/or other components that may be accessible to processor 604. For example, computer memory 626 and/or data storage 628 may supplement or supplant computer memory 606 and/or data storage 608 entirely or for a particular task or purpose. As another example, computer memory 626 and/or data storage 628 may be an external data repository (e.g., server farm, array, "cloud," etc.) and enable device 602, and/or other devices, to access data thereon. Similarly, input/output device(s) 630 may be accessed by processor 604 via human input/output interface 612 and/or via communication interface 610 either directly, via network 624, via network 620 alone (not shown), or via networks 624 and 620. Each of computer memory 606, data storage 608, computer memory 626, data storage 628 comprise a non-transitory data storage comprising a data storage device.

It should be appreciated that computer readable data may be sent, received, stored, processed, and presented by a variety of components. It should also be appreciated that components illustrated may control other components, whether illustrated herein or otherwise. For example, one input/output device 630 may be a router, a switch, a port, or other communication component such that a particular output of processor 604 enables (or disables) input/output device 630, which may be associated with network 620 and/or network 624, to allow (or disallow) communications between two or more nodes on network 620 and/or network 624. One of ordinary skill in the art will appreciate that other communication equipment may be utilized, in addition or as an alternative, to those described herein without departing from the scope of the embodiments.

Figure 7:
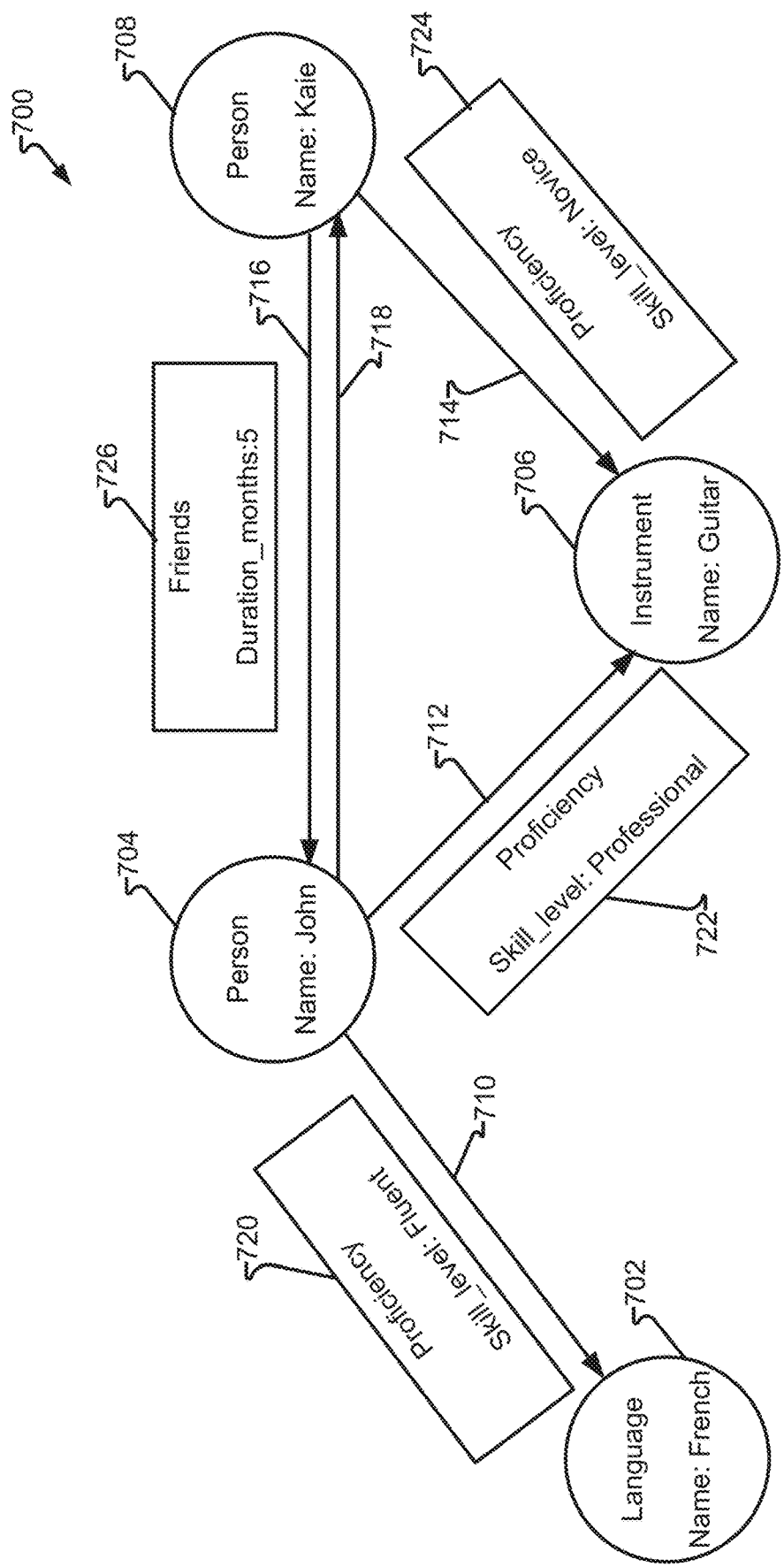
FIG. 7 depicts a graph in accordance with embodiments of the present disclosure.

FIG. 7 depicts graph 700 in accordance with embodiments of the disclosure. Neo4J is an example of a graph database management system that uses nodes (702, 704, 706, 708), edges (710, 712, 714, 716, 718) and properties (720, 722, 724, 726) to build a graph structure. Graph 700 supports the labeled property graph model, allowing one or more nodes (702, 704, 706, 708) and edges (710, 712, 714, 716, 718) to have several different labels, such as properties (720, 722, 724, 726). It also allows for bidirectional edges (716, 718). Graph 700 illustrates an example Neo4J graph where the top relation between John (node 704) and Katie (node 708) is bidirectional (edges 716, 718), while the relations between the people (nodes 704, 708) and the proficiencies (nodes 702, 706) are unidirectional (edges 710, 712, 714). In one embodiment, all the edges (710, 712, 714, 716, 718) contain properties (720, 722, 724, 726), allowing for more advanced queries to be used to fetch data. Neo4J uses the cypher query language for both the creation and retrieval of nodes and edges in its database. The cypher language allows for a wide variety of operations, and the creation of graph 700 can be done through the queries shown in Formula 4 (above).

In the foregoing description, for the purposes of illustration, methods were described in a particular order. It should be appreciated that in alternate embodiments, the methods may be performed in a different order than that described without departing from the scope of the embodiments. It should also be appreciated that the methods described above may be performed as algorithms executed by hardware components (e.g., circuitry) purpose-built to carry out one or more algorithms or portions thereof described herein. In another embodiment, the hardware component may comprise a general-purpose microprocessor (e.g., CPU, GPU) that is first converted to a special-purpose microprocessor. The special-purpose microprocessor then having had loaded therein encoded signals causing the, now special-purpose, microprocessor to maintain machine-readable instructions to enable the microprocessor to read and execute the machine-readable set of instructions derived from the algorithms and/or other instructions described herein. The machine-readable instructions utilized to execute the algorithm(s), or portions thereof, are not unlimited but utilize a finite set of instructions known to the microprocessor. The machine-readable instructions may be encoded in the microprocessor as signals or values in signal-producing components by, in one or more embodiments, voltages in memory circuits, configuration of switching circuits, and/or by selective use of particular logic gate circuits. Additionally or alternatively, the machine-readable instructions may be accessible to the microprocessor and encoded in a media or device as magnetic fields, voltage values, charge values, reflective/non-reflective portions, and/or physical indicia.

In another embodiment, the microprocessor further comprises one or more of a single microprocessor, a multi-core processor, a plurality of microprocessors, a distributed processing system (e.g., array(s), blade(s), server farm(s), "cloud", multi-purpose processor array(s), cluster(s), etc.) and/or may be co-located with a microprocessor performing other processing operations. Any one or more microprocessor may be integrated into a single processing appliance (e.g., computer, server, blade, etc.) or located entirely, or in part, in a discrete component and connected via a communications link (e.g., bus, network, backplane, etc. or a plurality thereof).

Examples of general-purpose microprocessors may comprise, a central processing unit (CPU) with data values encoded in an instruction register (or other circuitry maintaining instructions) or data values comprising memory locations, which in turn comprise values utilized as instructions. The memory locations may further comprise a memory location that is external to the CPU. Such CPU-external components may be embodied as one or more of a field-programmable gate array (FPGA), read-only memory (ROM), programmable read-only memory (PROM), erasable programmable read-only memory (EPROM), random access memory (RAM), bus-accessible storage, network-accessible storage, etc.

These machine-executable instructions may be stored on one or more machine-readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

In another embodiment, a microprocessor may be a system or collection of processing hardware components, such as a microprocessor on a client device and a microprocessor on a server, a collection of devices with their respective microprocessor, or a shared or remote processing service (e.g., "cloud" based microprocessor). A system of microprocessors may comprise task-specific allocation of processing tasks and/or shared or distributed processing tasks. In yet another embodiment, a microprocessor may execute software to provide the services to emulate a different microprocessor or microprocessors. As a result, a first microprocessor, comprised of a first set of hardware components, may virtually provide the services of a second microprocessor whereby the hardware associated with the first microprocessor may operate using an instruction set associated with the second microprocessor.

While machine-executable instructions may be stored and executed locally to a particular machine (e.g., personal computer, mobile computing device, laptop, etc.), it should be appreciated that the storage of data and/or instructions and/or the execution of at least a portion of the instructions may be provided via connectivity to a remote data storage and/or processing device or collection of devices, commonly known as "the cloud," but may include a public, private, dedicated, shared and/or other service bureau, computing service, and/or "server farm."

Examples of the microprocessors as described herein may include, but are not limited to, at least one of Qualcomm® Snapdragon® 800 and 801, Qualcomm® Snapdragon® 610 and 615 with 4G LTE Integration and 64-bit computing, Apple® A7 microprocessor with 64-bit architecture, Apple® M7 motion comicroprocessors, Samsung® Exynos® series, the Intel® Core™ family of microprocessors, the Intel® Xeon® family of microprocessors, the Intel® Atom™ family of microprocessors, the Intel Itanium® family of microprocessors, Intel® Core® i5-4670K and i7-4770K 22 nm Haswell, Intel® Core® i5-3570K 22 nm Ivy Bridge, the AMD® FX™ family of microprocessors, AMD® FX-4300, FX-6300, and FX-8350 32 nm Vishera, AMD® Kaveri microprocessors, Texas Instruments® Jacinto C6000™ automotive infotainment microprocessors, Texas Instruments® OMAP™ automotive-grade mobile microprocessors, ARM® Cortex™-M microprocessors, ARM® Cortex-A and ARM926EJ-S™ microprocessors, other industry-equivalent microprocessors, and may perform computational functions using any known or future-developed standard, instruction set, libraries, and/or architecture.

Any of the steps, functions, and operations discussed herein can be performed continuously and automatically.

The exemplary systems and methods of this invention have been described in relation to communications systems and components and methods for monitoring, enhancing, and embellishing communications and messages. However, to avoid unnecessarily obscuring the present invention, the preceding description omits a number of known structures and devices. This omission is not to be construed as a limitation of the scope of the claimed invention. Specific details are set forth to provide an understanding of the present invention. It should, however, be appreciated that the present invention may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components or portions thereof (e.g., microprocessors, memory/storage, interfaces, etc.) of the system can be combined into one or more devices, such as a server, servers, computer, computing device, terminal, "cloud" or other distributed processing, or collocated on a particular node of a distributed network, such as an analog and/or digital telecommunications network, a packet-switched network, or a circuit-switched network. In another embodiment, the components may be physical or logically distributed across a plurality of components (e.g., a microprocessor may comprise a first microprocessor on one component and a second microprocessor on another component, each performing a portion of a shared task and/or an allocated task). It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the invention.

A number of variations and modifications of the invention can be used. It would be possible to provide for some features of the invention without providing others.

In yet another embodiment, the systems and methods of this invention can be implemented in conjunction with a special purpose computer, a programmed microprocessor or microcontroller and peripheral integrated circuit element(s), an ASIC or other integrated circuit, a digital signal microprocessor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this invention. Exemplary hardware that can be used for the present invention includes computers, handheld devices, telephones (e.g., cellular, Internet enabled, digital, analog, hybrids, and others), and other hardware known in the art. Some of these devices include microprocessors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein as provided by one or more processing components.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this invention can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Embodiments herein comprising software are executed, or stored for subsequent execution, by one or more microprocessors and are executed as executable code. The executable code being selected to execute instructions that comprise the particular embodiment. The instructions executed being a constrained set of instructions selected from the discrete set of native instructions understood by the microprocessor and, prior to execution, committed to microprocessor-accessible memory. In another embodiment, human-readable "source code" software, prior to execution by the one or more microprocessors, is first converted to system software to comprise a platform (e.g., computer, microprocessor, database, etc.) specific set of instructions selected from the platform's native instruction set.

Although the present invention describes components and functions implemented in the embodiments with reference to particular standards and protocols, the invention is not limited to such standards and protocols. Other similar standards and protocols not mentioned herein are in existence and are considered to be included in the present invention. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present invention.

The present invention, in various embodiments, configurations, and aspects, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments, configurations, or aspects for the purpose of streamlining the disclosure. The features of the embodiments, configurations, or aspects of the invention may be combined in alternate embodiments, configurations, or aspects other than those discussed above. This method of disclosure is not to be interpreted as reflecting an intention that the claimed invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the invention.

Moreover, though the description of the invention has included description of one or more embodiments, configurations, or aspects and certain variations and modifications, other variations, combinations, and modifications are within the scope of the invention, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

What is claimed is:

1. A system to remediate a software fault, comprising:
a processor coupled with a computer memory comprising computer readable instructions to cause the processor to perform:
accessing a list of packages each comprising a portion of a software application wherein at least one of the list of packages is required by at least one other of the list of packages and each of the list of packages is identified by a compatible version;
accessing a list of faulty packages comprising at least one of the list of packages that has a known fault and a corresponding faulty version number; and
mapping a safe build list for a target software to comprise each of the list of packages and for each package of the list of packages a corresponding version number selected from the compatible version but that excludes any faulty version number.

2. The system of claim 1, wherein the processor further performs building a target software application from the safe build list.

3. The system of claim 2, wherein, upon being built, the processor causes the target software application to be executed by a device.

4. The system of claim 1, wherein the processor further performs:
upon determining no safe build list can be built as, for at least one of the list of packages, comprising determining no solution exists that comprises a compatible version and excludes all faulty version numbers and, in response thereto, performs a failed build operation.

5. The system of claim 1, wherein, for at least one package, the faulty version number is associated with at least one version of the at least one package having a security vulnerability.

6. The system of claim 1, wherein, the processor mapping the safe build list produces a plurality of safe build lists having a dissimilar compatible version number within the compatible version and wherein the mapping further comprises selecting a highest version number of the dissimilar compatible version numbers.

7. The system of claim 1, wherein the compatible version comprises a single version.

8. The system of claim 1, wherein the processor performs the mapping comprising traversing a graphical data structure maintained in a memory accessible to the processor and wherein each of the list of packages is represented as a node of the graphical data structure in a hierarchical order determined from interdependencies between one of the list of packages or a dependency of the software application.

9. The system of claim 8, wherein the graphical data structure comprises a tree data structure.

10. The system of claim 1, wherein at least a portion of the list of packages comprises an open-source package.

11. A method to remediate a software fault, comprising:
accessing a list of packages, each comprising a portion of a software application wherein at least one of the list of packages is required by at least one other of the list of packages and each of the list of packages is identified by a compatible version;
accessing a list of faulty packages comprising at least one of the list of packages that has a known fault and a corresponding faulty version number; and
mapping a safe build list for a target software to comprise each of the list of packages and for each package of the list of packages a corresponding version number selected from the compatible version but that excludes any faulty version number.

12. The method of claim 11, further comprising building the target software from the safe build list.

13. The method of claim 12, wherein, upon being built, the target software loads the target software to a device, the device having at least one device processor, for execution thereon.

14. The method of claim 11, further comprising:
determining the mapping of the safe build list cannot be built, upon further determining that, for at least one of the list of packages, no solution exists that comprises a compatible version and excluding all faulty version numbers and, in response thereto, performing a failed build operation.

15. The method of claim 11, wherein, for at least one package, the faulty version number is associated with at least one version of the at least one package having a security vulnerability.

16. The method of claim 11, wherein mapping the safe build list produces a plurality of safe build lists having a dissimilar compatible version number within a compatible version range and wherein the mapping further comprises selecting a highest version number of the dissimilar compatible version numbers.

17. The method of claim 11, wherein the compatible version comprises a single version.

18. The method of claim 11, wherein the mapping comprises traversing a tree data structure maintained in a memory and wherein each of the list of packages is represented as a node within the tree data structure in a hierarchical order determined from interdependencies between one of the list of packages or a dependency of the software application.

19. The method of claim 11, wherein at least a portion of the list of packages comprises an open-source package.

20. A system, comprising:
a memory:
means to access a list of packages, each comprising a portion of a software application wherein at least one of the lists of packages is required by at least one other of the lists of packages and each of the list of packages is identified by a compatible version;
means to access a list of faulty packages comprising at least one of the lists of packages that has a known fault and a corresponding faulty version number; and means to map a safe build list for a target software to comprise each of the lists of packages and for each package of the list of packages a corresponding version number selected from the compatible version but that excludes any faulty version number.

* * * * *